United States Patent

Hurlburt

[15] 3,664,101
[45] May 23, 1972

[54] CROP GATHERING AND CONVERGING REEL

[72] Inventor: Joseph C. Hurlburt, Leola, Pa.

[73] Assignee: Sperry Rand Corporation, New Holland, Pa.

[22] Filed: Sept. 11, 1970

[21] Appl. No.: 71,551

[52] U.S. Cl. .............................................. 56/220
[51] Int. Cl. ........................................... A01d 57/00
[58] Field of Search ................. 56/12.4, 12.5, 14.1, 14.2, 56/14.3, 14.4, 219, 220, 221, 192

[56] References Cited

UNITED STATES PATENTS

| 3,233,395 | 2/1966 | Dahl et al. | 56/192 |
| 3,319,408 | 5/1967 | Landwehr | 56/220 |
| 3,400,526 | 9/1968 | Tuft | 56/220 |
| 2,999,348 | 9/1961 | Cunningham | 56/192 |
| 3,338,036 | 8/1967 | Hurlburt | 56/14.4 |
| 3,555,796 | 1/1971 | Baumeister | 56/221 |

Primary Examiner—Antonio F. Guida
Attorney—Joseph A. Brown, John C. Thompson, James J. Kennedy and George C. Bower

[57] ABSTRACT

A crop gathering and converging reel has two reel sections rotatably mounted on a transverse stationary tube with adjacent ends of the reel sections overlapping. The two reel sections have opposite angularities to sweep cut crop rearwardly into the header and laterally towards the center for converging the cut crop to a narrower discharge.

21 Claims, 23 Drawing Figures

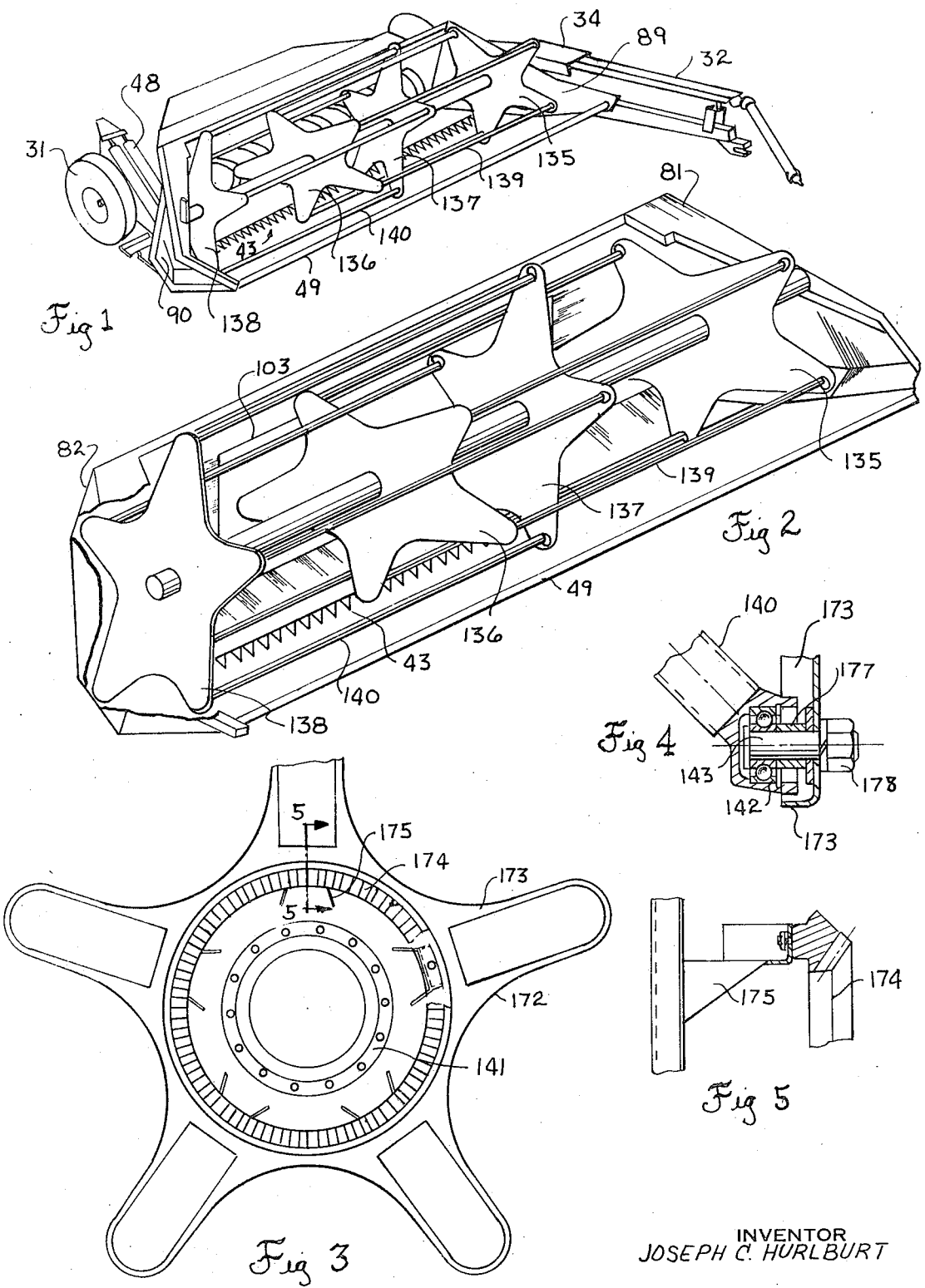

INVENTOR
JOSEPH C. HURLBURT

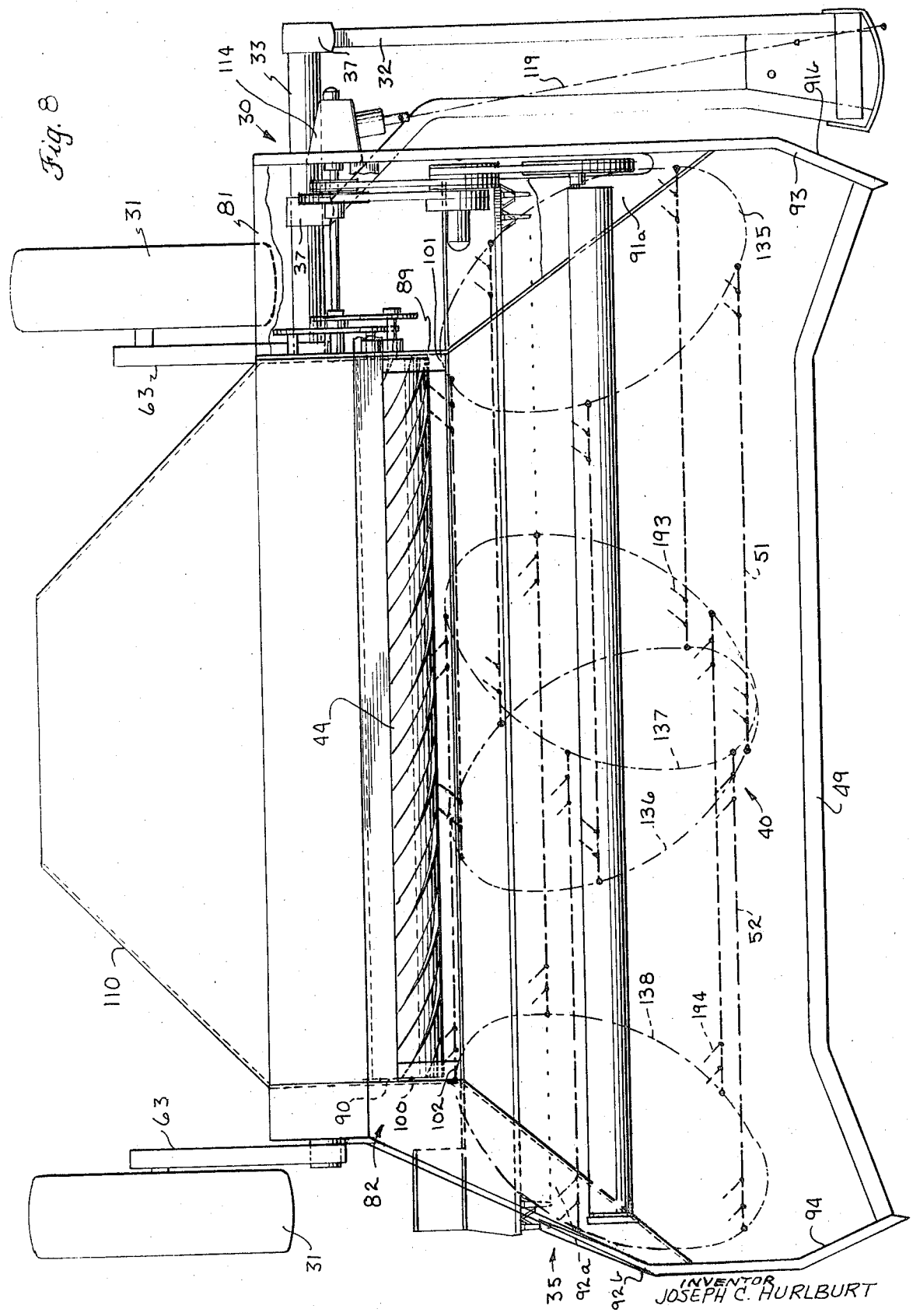

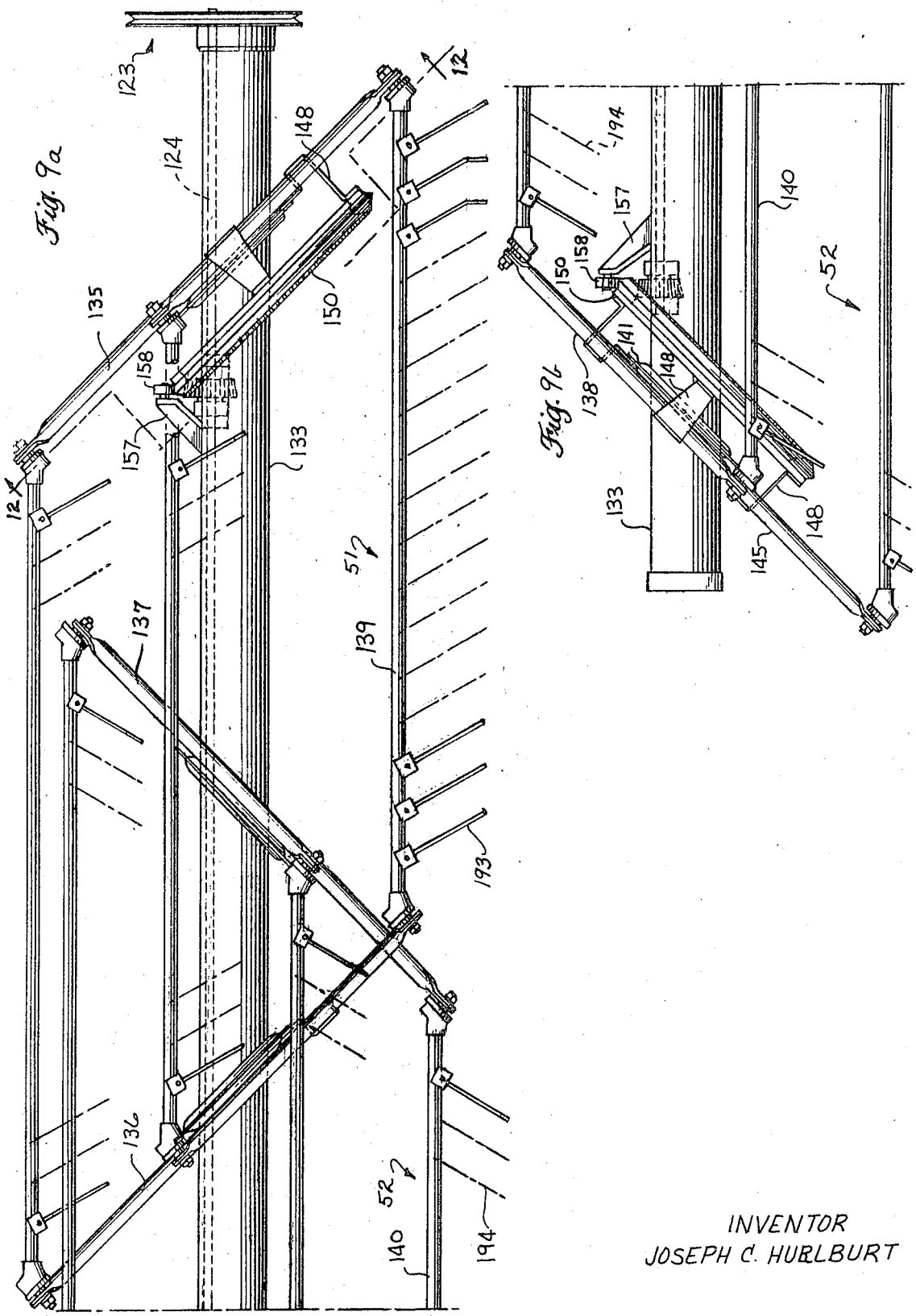

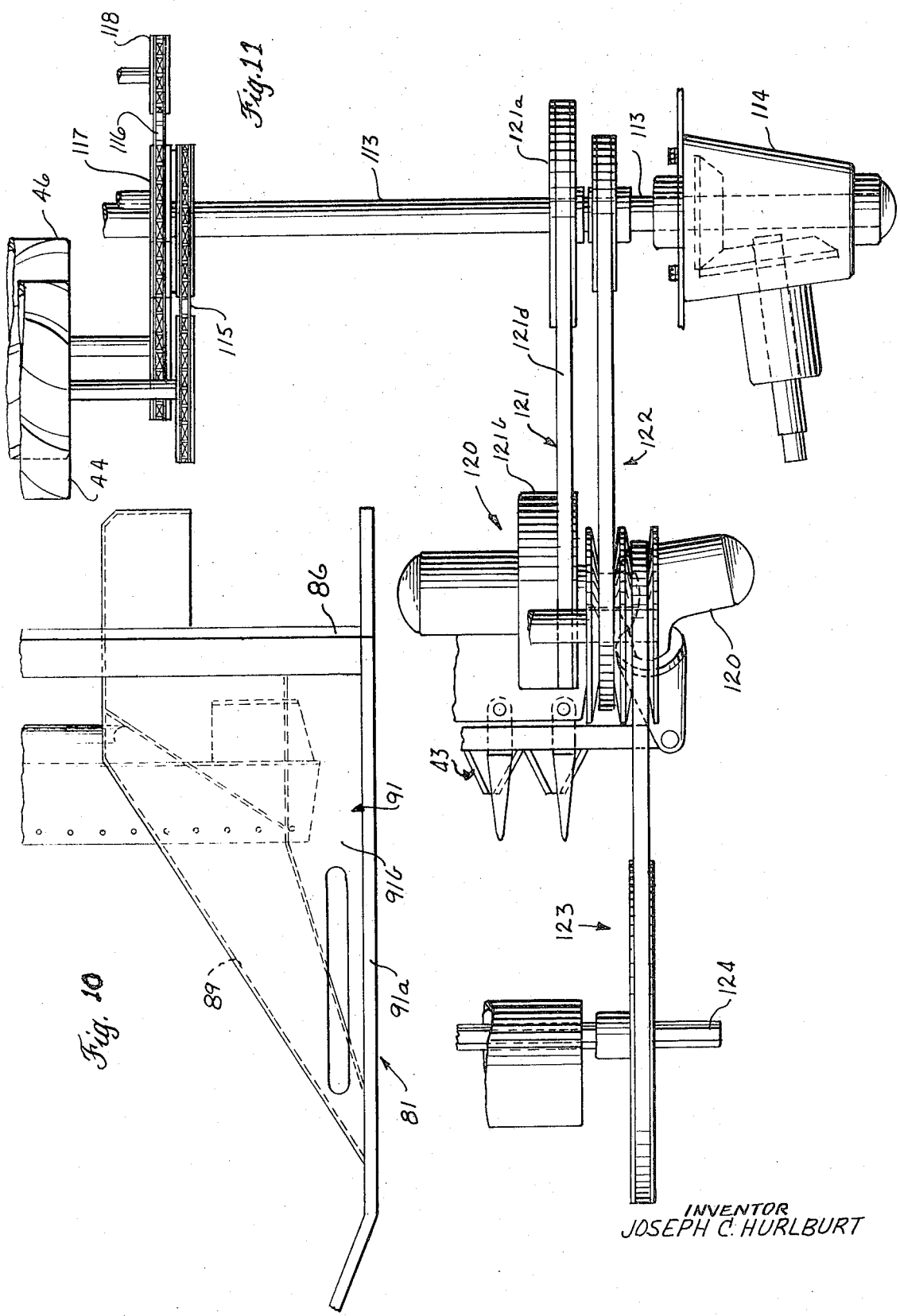

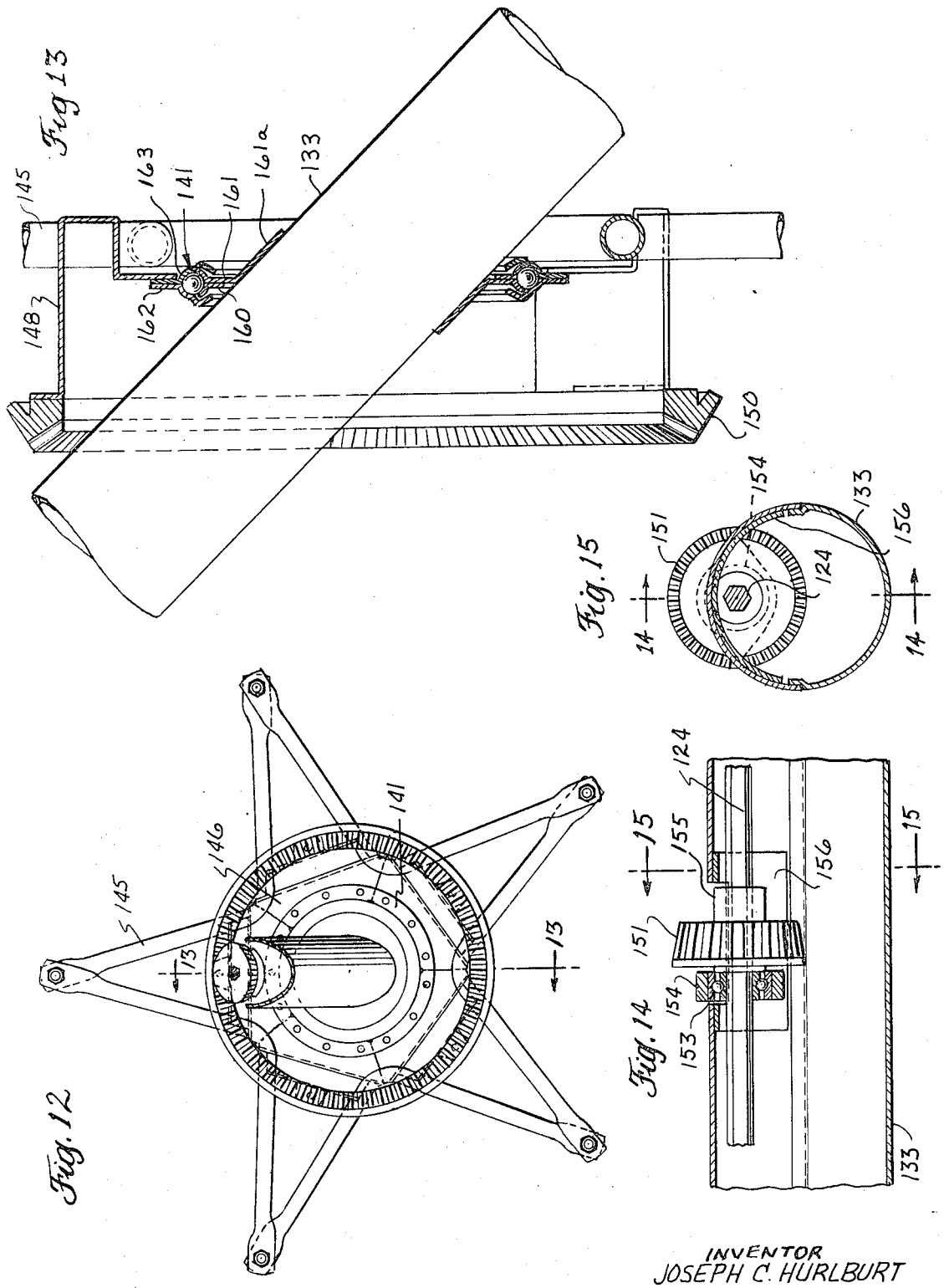

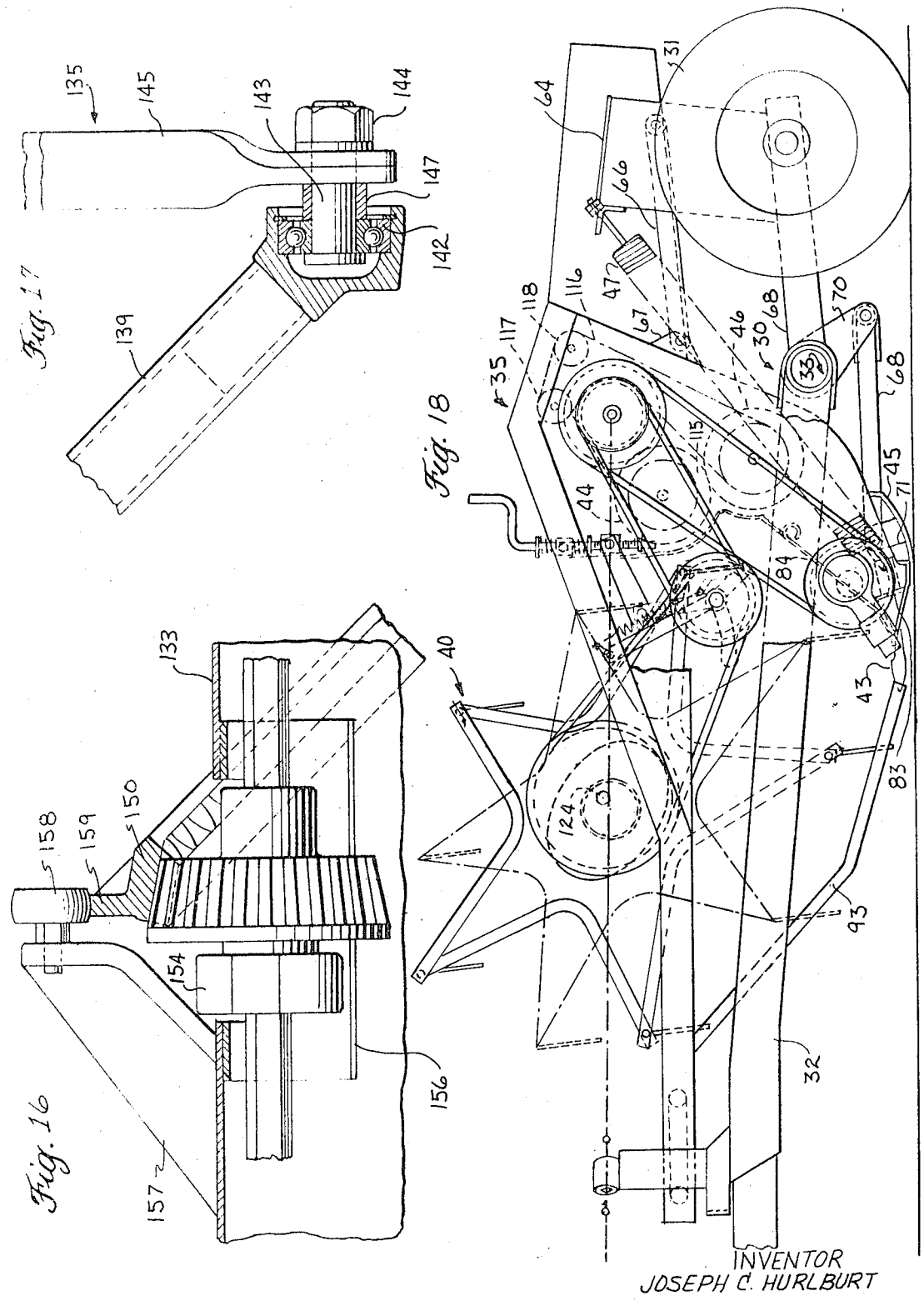

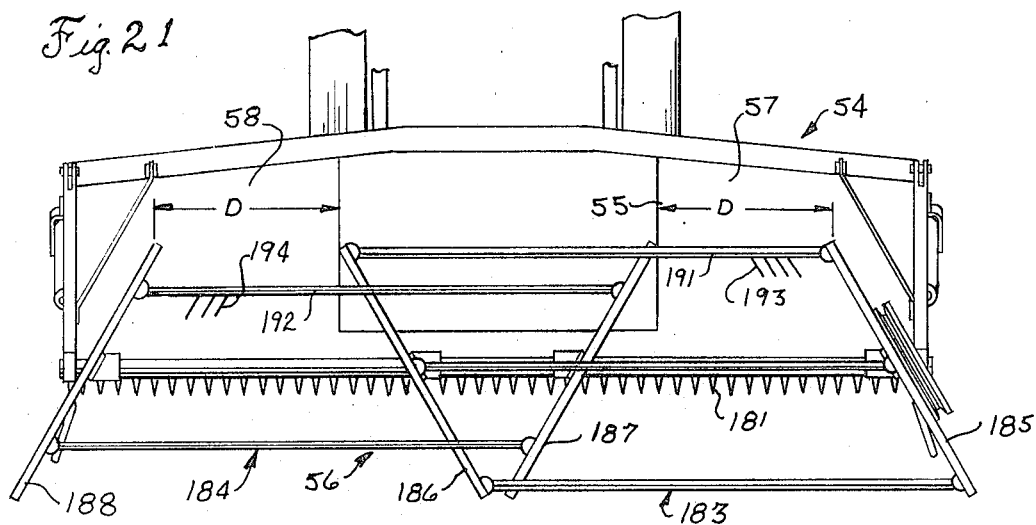
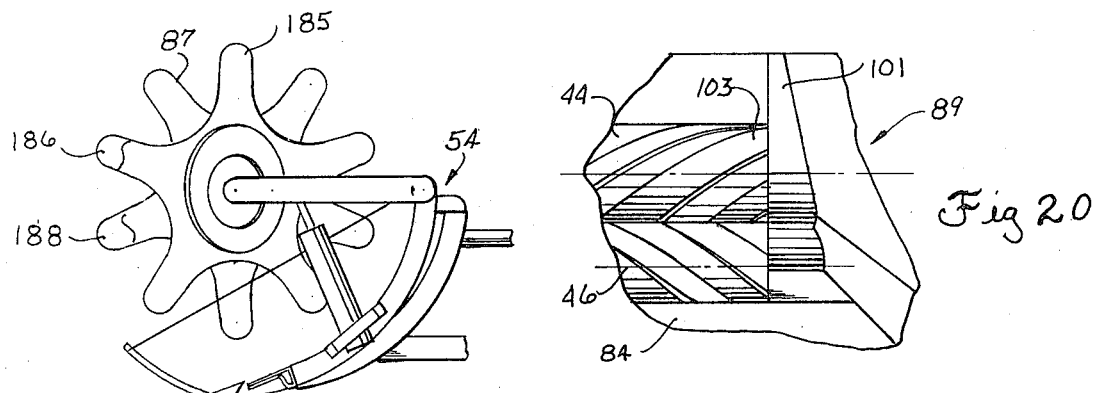
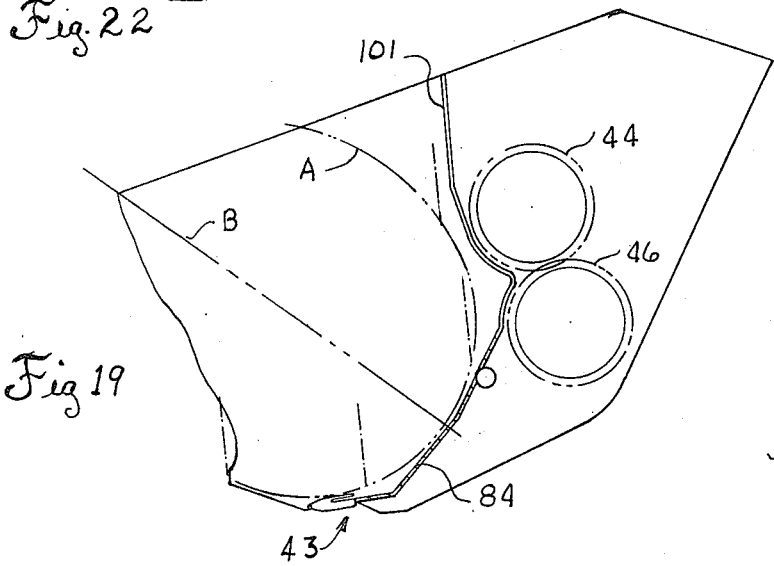
INVENTOR.
JOSEPH C. HURLBURT

3,664,101

CROP GATHERING AND CONVERGING REEL

BACKGROUND OF THE INVENTION

This invention relates to the consolidation of cut crops and is directed particularly to reels on headers mounted on pull-type harvesters, combines, self-propelled harvesters, forage harvesters or the like.

In the harvesting of crops for storage, the cut crops are often conditioned to facilitate drying. The headers have conditioning rolls passing the crop after being cut by the sickle. For various reasons these rolls are of a limited length. Rolls with ribbed rubber surfaces are limited in length by the size of the molds. On small mower-conditioners the sickle and rolls are the same length. Large mower-conditioners have sickles substantially longer than the rolls. The cut crops are converged or consolidated to pass through the conditioning rolls.

Some methods are used for reducing the width of the cut crop and feeding it through the shorter rolls. One standard method is to provide an auger to the rear of the reel for moving the cut crops transversely to the center for forming a windrow or feeding the crop to conditioning rolls. Another method has been to provide drapers as in the floor of the header to carry the cut material to the center for delivery to conditioning rolls. Another method is to cut and consolidate the crop and deposit it on the ground and then pick it up and pass it through conditioning rolls.

The consolidation of crops by an auger has the disadvantage of increasing the depth of the header and positioning the center of mass of the header further forward from the header suspension system. Also the auger increases the weight of the header which further complicates the suspension system. Other disadvantages are that there must be provided an additional drive for the auger, additional supports and means for mounting the auger in the header.

The headers that have two drapers, one on each side of the header to carry the cut crop to the center, have many disadvantages. The drapers are wide belts which are mounted on power driven rollers. The maintenance of these drapers is costly and time consuming. The drapers require a great deal of attention for proper operation, are an extra expense and are costly to maintain. As with the auger the drapers require a drive for operating the belts.

Another common disadvantage of augers and drapers is that the movement of the material by the auger or the drapers is at right angles to the motion of the reel. This means that the crops make a right angle turn for conveyance to the center of the header. This turning of the crop material can be abusive and with some crops, in which the grain on the stems is subject to dislodgement, may cause a high grain loss. Another disadvantage of the draper is that it delivers the crop to the center of the header but cannot pass the crops through conditioning rolls. All the drapers can do is narrow the discharge of the crop. Additional means are needed to feed the crop.

Further the depositing of the crop in a windrow or narrower swath on the ground and in picking the crop from the windrow for passing through conditioning rolls has the objection of twice handling the crop. This means two separate units on a machine one to cut and form the windrow and another to pick it up for conditioning.

It is the general purpose of this invention to provide a pull type or a self-propelled type crop handling machine for passing and carrying crop material by a reel-type means and supporting frame directly from a forward entering area to a rearward narrower discharge without the interposition of converging crop feed means between the reel-type means and discharge for providing the machine with a shallow depth and the center of mass close to the suspension system. A particular purpose is to provide a harvesting header that directly feeds cut crops by reel means to conditioning rolls from a sickle longer than the length of the rolls. It is further desirable that the header is lighter in weight and less expensive than comparable headers.

OBJECT AND SUMMARY OF THE INVENTION

An object of the invention is to provide a crop gathering and converging reel means cooperating with a supporting frame to sweep the cut crop material distributed along the width of the crop gathering and converging reel means directly to a narrower discharge.

Another object of the invention is to provide a header having a width substantially greater than the discharge and having crop converging means that is lighter in structure and provides for a shorter header in the direction of travel than comparable present headers.

Another object of the invention is to provide a single means on a supporting frame that sweeps crops across a sickle and converges the cut crop to a discharge narrower than the sickle.

Another object of the invention is to provide a crop converging means that sweeps crop material diagonally past the sickle and across a supporting frame to a narrower discharge.

Another object of the invention is to provide a wide harvester header that consolidates cut crop material to a narrower discharge without consolidating augers or drapers.

Another object of the invention is to provide a crop gathering and converging reel on a header that sweeps crops across a sickle and converges the cut crop for discharge to shorter conditioning rolls.

Another object of the invention is to provide a mower-conditioner with a crop converging reel that has crop tine sweeping in a path in front of and lower than the sickle for engaging down crop material and carrying the crop past the sickle and up to crop conditioning rolls that are shorter than the width of the sickle.

These and other objects and advantages of this invention will be apparent from the following description and claims taken in connection with the accompanying drawings which illustrate the various features of this invention.

In summary, this invention is a gathering reel means on a supporting frame having at the front a wide entering area with the gathering reel means thereacross and a narrower discharge at the rear and the gathering reel means comprising two rotating reels turning about the same axis and oppositely angled with adjacent ends of the reels overlapping for consolidation and direct conveyance of cut crops from a wide swath at the forward entering area to the narrower discharge at the rear.

BRIEF DESCRIPTION OF THE DRAWINGS

FIG. 1 is a perspective view of a mower-conditioner with one embodiment of the crop converging reel.

FIG. 2 is a perspective view of the crop converging reel and the supporting and cooperating frame.

FIG. 3 is a side plan view of one form of the crop converging reel spider.

FIG. 4 illustrates the rotatable attachment of the tine bars to the spider of FIG. 3.

FIG. 5 is a side view of one of the mounting brackets supporting the ring gear on the spider of FIG. 3.

FIG. 8 is a top view of the mower-conditioner of FIGS. 6 with the crop converging reel indicated by dot-dash lines.

FIGS. 9a and 9b are fragmentary views of the crop converging reel and supporting tube with the plane of the spiders parallel to the direction of viewing.

FIG. 10 is a top view of the left end of the frame of the mower-conditioner of FIG. 6 without reel, conditioning rolls and sickle.

FIG. 11 is a top plan view of the drive system for the reel, sickle and conditioning rolls.

FIG. 12 is a side view of the left spider and ring gear taken in the direction of arrows 12—12 of FIG. 9a.

FIG. 13 is a fragmentary sectional view of the left spider taken along lines 13—13 of FIG. 12 illustrating the bearing rotatably supporting the spider on the support tube.

FIG. 14 is a fragmentary longitudinal section view of the support tube taken along lines 14—14 of FIG. 15 to illustrate the mounting of the bevel gear driving the left crop gathering reel section.

FIG. 15 is a cross sectional view of the bevel gear mounting taken along lines 15—15 of FIG. 14.

FIG. 16 is a fragmentary sectional view of the drive shaft and support tube illustrating the spur and ring gear drive with a ring gear hold down means.

FIG. 17 illustrates the connections of the tine bar and spider with the bearing shown in section.

FIG. 18 is an end view of the mower-conditioner of FIG. 8 illustrating the reel and drive system.

FIG. 19 is a sectional view of the header illustrating the path of the tips of the tines to ground, the sickle, guide plate and rolls.

FIG. 20 is a fragmentary front view of the ends of the conditioning rolls and adjacent portion of the header.

FIG. 21 is a top view of a windrower with a crop converging reel.

FIG. 22 is an end view of the windrower of FIG. 21.

INTRODUCTION

Figures 6, 7:
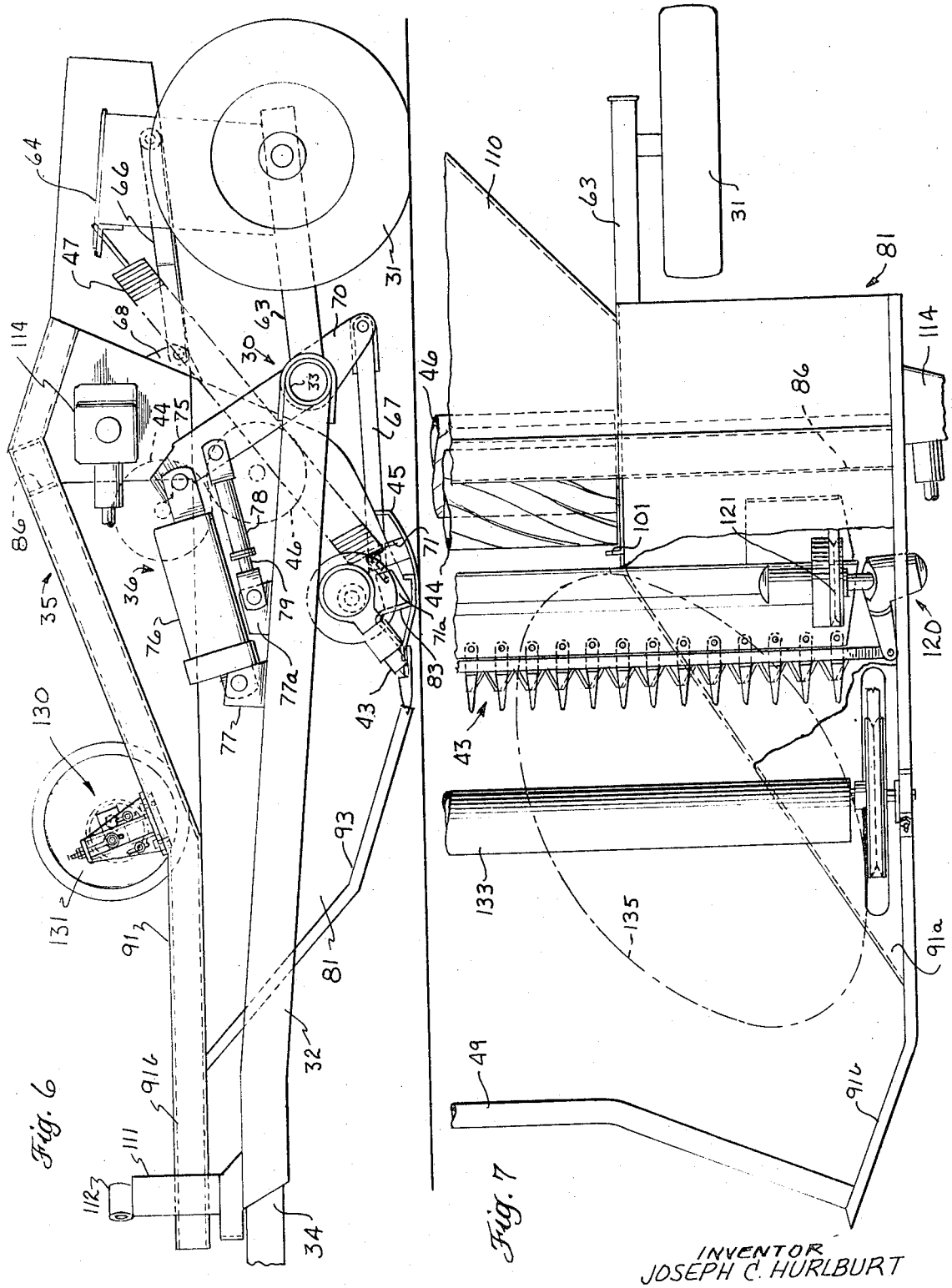
FIG. 6 is an end view of a pull type mower-conditioner without the reel and drive system.
FIG. 7 is an enlarged top view of the left end of the mower-conditioner of FIG. 6 with the reel omitted.

For a fuller understanding of the features and advantages of the invention it has been described as embodied in a mower-conditioner in which a gathering reel sweeps the crop across a sickle wider than the following and discharging conditioning rolls. The mower-conditioner is of the pull type and in relating the various elements of the machine the term "inboard" is used for the power input side of the mower-conditioner and the term "outboard" for the opposite side of the mower-conditioner. The orientations "right" and "left" are also used in the description when facing in the forward direction of travel of the machine. Standard nomenclature is used in referring to the width of the header as the long dimension transverse to the direction of travel and the depth as the longitudinal dimension in the direction of travel.

The mower-conditioner as illustrated in FIGS. 1, 6 to 20 has a generally L-shaped supporting frame 30 with rear, transversely spaced, ground engaging wheels 31 and a draft frame 34 with a forward drawbar 32 for connection to and support by a drawing tractor, not shown. A header 35 is pivotally attached to the frame 30 by a four-bar linkage (FIG. 6) for pivotal movement of the header through a range of generally parallel mowing positions. The header is raised to a transport position by a lift mechanism 36 mounted on the supporting frame. A crop gathering reel 40 is rotatably mounted on the header to sweep crop material across the sickle 43 and up into conditioning rolls 44,46 of equal lengths which are less than the width of the sickle and the crop gathering reel (FIG. 7 & 8). The width of the reel converges rearwardly and the header, correspondingly, has rearwardly converging sides 81,82. A portion of the weight of the header is carried by skid shoes 45 (FIG. 6) on opposite sides of the header and the remainder of the weight is carried by two pairs of suspension springs 47,48 attached to the frame.

The gathering and converging reel comprises two coaxial reel sections 51,52 (FIGS. 1, 8, 9a and 9b) of opposite angularities overlapping at the middle of the header. The reel is wider in front of the sickle than at the rear adjacent to the conditioning rolls. In the mower-conditioner embodiment, the rear width of the reel and the conditioning rolls are about the same. However in FIGS. 21 and 22 a windrower embodiment is shown of the invention in which the discharge opening 55 in the header 54 is substantially shorter than the rear width of the reel 56. In this embodiment the reel 56 cooperates with the rear walls 57,58 of the header on each side of the opening to successively sweep the crop material toward the middle of the header until discharged through the opening 55.

SUPPORTING FRAME AND HEADER MOUNTING

The main elements of the supporting frame 30 are draft member 32 extending longitudinally along the inboard and left side of the header 35 and a tubular rockshaft 33 extending transversely in back of the header. The rockshaft 33 is rotatably mounted in space bearings 37 (FIG. 8) on the rear end of the draft member 32. The frame is supported in front by the drawbar 34 pivotally attached to the front end of the longitudinally extending draft member 32 and in the rear by two ground engaging wheels 31. The wheels are rotatably mounted on transversely spaced rearwardly extending wheel arms 63 welded to the rotatable rockshaft 33.

The header 35 is pushed by the frame 30 through the four-bar linkage (FIG. 6) comprising a pair of upper links 66 and a pair of lower links 67. Links 66 are pivotally connected to posts 64 on the wheel arms and to lugs 68 on the header. The lower links 67 are pivotally connected to rock arms 70 extending downwardly from the rockshaft 33 and to lugs 71 at the bottom of the header. The four-bar linkage imparts a substantially vertical movement of the sickle 43 and header as the header moves up and down during the mowing operation. The links are also utilized to pivot the header to a transport position through the actuation of the lift mechanism 36 on the inboard side of the frame.

The lift mechanism comprises a lift arm 75 welded to the rock-shaft and a hydraulic cylinder 76 pivotally connected to the bracket 77 mounted on the top of the draft member. Extension of the hydraulic cylinder rotates the rockshaft through the lift arm 75. The rock arms 70 which are welded to the rockshaft rotate lifting the header by means of the lower pair of linkages. A telescopic locking link 78, pivotally connected to the lift arm 75 and to the bracket 77a on the draft member, holds the header in the raised or transport position by the fitting of a locking sleeve (not shown) over the inner telescoping member 79. The sleeve relieves the cylinder from supporting the header in the raised position and prevents actuation of the cylinder.

As previously described in the mowing position a portion of the header weight is carried by the skid shoes 45 on opposite sides of the bottom of the header. The remainder of the weight is carried by the frame through the pairs of springs 47,48 (FIGS. 1 & 6) transversely spaced adjacent to the respective rear wheels by connection to the vertical upwardly extending posts 64 mounted on the wheel arms 63 and to the lugs 71a on the cutter bar 83.

HEADER FRAME

The header frame supports the rotatable crop gathering reel 40 with its axis of rotation upwardly and forwardly of the ground sickle 43 to sweep crops into the sickle and upwardly to the rotatably mounted conditioning rolls 44,46 spaced rearwardly and upwardly from the sickle. The frame essentially comprises two side members 81,82 (FIG. 8) and transverse cutter bar 83, guide plate 84 and upper beam 86 (FIG. 5) extending across the width of the header to tie the side members together.

The inboard and outboard side members 81,82 are of similar construction except the inboard side member is modified to carry the drive means operating the gathering reel 40, sickle 43 and conditioning rolls 44,46. The side members 81,82 have downwardly and outwardly extending side panels 89,90 forming facing recesses for accommodating the converging opposite ends of the reels as the ends sweep across the outer ends of the sickle and converging inwardly to the shorter conditioning rolls 44,46. Support beams on top comprise top panels 91a, 92a and outer channel members 91b,92b extending forwardly to in front of the reel 40 to support the leading crop engaging bar 49. The top panels 91a,92a are welded along their outer edges to the channels 91b,92b and along the inner edge to the top of the side panels 89,90. Re-enforcing strips 93,94 extend from the channels along the bottom edge of the side panels to respective end guards on the sickle. The side panels have conditioning roll support plates 99,100 extending rearwardly from the rear edges of the side panels 89,90 and parallel to the line of travel for supporting the conditioning rolls. Flange pieces 101,102 normal to the conditioning supporting plates extend generally vertically along the seam between the side plates and the respective conditioning support plates. Along the portion of the side plates extending outwardly the flanges also expand to cover the area between the end of the conditioning rolls and the side plates. The flanges are shaped to follow the contour and bite of the conditioning rolls and form spaces rearwardly of the tips of the tines, as illustrated in FIG. 19. As previously described in connection with FIGS. 5 & 18, the cutter bar 83, guide plate 84 and upper beam 86 extend traversely to the header to tie the side members 81,82 together. The cutter bar 83 extends transversely across the full width of the header between the outer extremities of the lower edges of the side panels. The guide plate 84 extending upwardly and rearwardly from the cutter bar is fastened to the rearwardly extending rear flange of the cutter bar. The guide plate extends upwardly at a sharp angle towards the bite of the slightly downwardly facing conditioning rolls 44,46. The upper beam 86 extends along the top between the channels and is welded at intermediate points to the top edges of the conditioning support plates. The upper beam has a generally rectangular shape and is positioned generally above the conditioning rolls. The lugs 68 to which the upper links 66 of the four-bar linkage are pivotally connected, are mounted along the back edge of the support plate at about the level of the bite of the conditioning rolls.

The rockshaft 33 is positioned below the bite of the conditioning rolls. The inner edges of the flanges 101,102 (FIG. 8) and the top of the guide plate 84 form a discharge opening 103 (FIGS. 1, 2 & 20) for passing of crop material into the bite of the conditioning rolls. With the rockshaft positioned below the bite and the upper transverse beam 86 positioned above the rolls the space to the rear of the conditioning rolls is clear for an upward discharge of the cut and crushed crops. The crop swathing and windrow forming means 110 is secured to the back of the upper beam 86 and conditioning support side panels 89,90 (FIG. 8) and extends rearwardly therefrom to pass cut and conditioned crops. The crop swathing and windrow forming means 110 has a generally U-shaped converging housing with an open portion facing the ground. Swath forming plates and windrow forming plates (not shown) are mounted within the housing for either directing the cut and conditioned crops into windrows or swaths as it may be desired.

DRIVE MEANS

In FIGS. 8 and 11 the drive means for the crop converging reel 40, sickle 43 and conditioning rolls 44,46 are best shown. The gearbox 114 on the left rear corner of the header as shown in FIG. 6. The input drive means connected to the tractor power takeoff is indicated in dot-dash lines 119. Various types of input drives may be used, however, the input drive described in the copending application Ser. No. 804,537 filed July 28, 1969 and entitled "Drive Systems for Pull-Type Mower Conditioner" is preferred. This drive is mounted on the post 111 at the front of the draft member 32 by being rotatably mounted in the sleeve 112 supported by the post. The drive system provides a minimum of acceleration and deceleration of the input shaft to the gearbox 114 as the mower and header move over the range of mowing conditions. The drive means is not subjected to variations in speeds and surges of driving power due to the variation in the position of the header as it moves along the ground.

The output shaft 113 of the gearbox 114 is directly connected to the two chain and sprocket drives 115,116 driving the upper and lower conditioning rolls. The upper conditioning roll 44 is driven directly by the drive 115 from the output shaft. The lower conditioning roll is driven by the sprocket and chain drive 116 traveling over the two upper smaller sprockets 117,118 (FIG. 4). The lower sprocket on the lower conditioning roll is driven in reverse to the upper sprocket so that the conditioning rolls are moving in the same direction at the contacting bite. Overrunning clutches are provided in the drive sprockets of drives 115,116.

The sickle 43 is driven by a conventional wobble drive 120 (FIGS. 7 & 11) through the belt and pulley drive 121 formed by the pulley 121a on the output shaft of the gearbox and the pulley 121b on the wobble drive interconnected by the V-belt 121c.

The gathering reel 40 is driven from the output shaft 113 by the variable sheave drive 122 and belt and pulley drive 123. The drive 123 is attached to the hexagonal shaped drive shaft 124 extending transversely across the header.

CROP CONVERGING OR GATHERING REEL

The crop converging or gathering reel 40 has mounting means 130 adjustably secured to the side members 81,82. The reel sections 51,52 are rotatably mounted on the mounting means 130. The mounting means comprises a large diameter tubular member 133 with a large axially extending chamber therein and bracket 131,132 adjustably securing the tubular member 133 to the top panels 91a,92a of the side members so that the tubular member may be positioned fore-and-aft and vertically for adjustment of the path of the tines on the reel 40 in relation to the sickle 43 and conditioning rolls 44,46.

Each of the reel sections 51,52 has end spiders 135,136 and 137,138 connected by tine bars 139,140 (FIGS. 1, 2, 8, 9a and 9b). The spiders are rotatably mounted on the tubular member by a ball bearing 141 (FIG. 13). The tine bars 139,140 are connected to the spiders by ball bearings 142 mounted on studs 143 (FIG. 17) affixed to the spiders by spacing sleeves 144 and nut 147. The spiders are mounted at an angle to the horizontal and to the vertical plane in the direction of travel of the machine. This is best seen in FIGS. 2 and 8. In this double tilt position the tines move in an elliptical path as best illustrated in FIG. 19.

The spiders may be made of V-shaped tubular members 145 attached to a sheet metal hub 146 as illustrated in FIG. 12 or may be made of a stamp sheet metal as shown in FIG. 3 and later described herein. The embodiment shown on FIG. 12 comprises five V-shaped tubular members 145 welded to the five edge sheet metal hub 146 which is bolted to the outer race of the ball bearing 141. The outer ends of members 145 are connected to the tine bars as illustrated in FIG. 17. The tine bars are at an angle to the respective studs and revolves about the axis of the stud.

The hub 146 has multiple brackets 148 secured thereto, FIGS. 12 & 13. The brackets are perpendicular to the plane of the spiders and support the ring gears 150. The ring gear matches with the bevel gear 151 mounted on the hexagonal drive shaft 124 to rotate with the shaft and drive the ring gear as best illustrated in FIGS. 14 and 16. The hexagonal shaft 124 is supported by the ball bearings 153 which are secured to the respective brackets 154 on the inside of the tubular member. The spur bevel gear 151 projects through the opening 155 in the tubular member 133 for engagement by the ring gear. The brackets 154 supporting the bevel gears 151 and bearings 153 have cylindrical plate-like portions 156 around the opening 155 to reinforce the tubular member 133. A bracket 157 is mounted on the outside of the tubular member and extends toward the ring gear to support the roller 158 engaging the track 159 on the back of the ring gear 150, FIG. 16. The function of this bracket and roller is to hold the ring gear in engagement with the spur gear so that the two reel sections are geared in relation to one another and rotate together.

The ball bearings 141, FIG. 13, supporting the spiders have the inner and outer races made from sheet metal members 160,161,162,163. The inner race, formed by members 161,162, has a cylindrical portion 161a fastened to the tubular member 133 with the outwardly extending portion at the desired angle to the spider. The second member 163 is welded to the other to form the inner race. The outer race is formed of two members 162,163 with flange portions extending around the inner race for isolating the inner and outer races of the bearing. The hubs 148 are mounted on the outwardly extending portions of these circular members 162,163 forming the outer race.

The tines 193,194, mounted on the tine bars 139,140, extend nearly perpendicularly downward and are tilted with the free ends towards the adjacent side of the header of a respective reel section as illustrated in FIGS. 9, 9a and 9b. The tines are preferably in planes generally parallel to the spiders or end members of the respective reel sections. With the spiders 135, 136, 137, 138 are mounted on the tubular member 133 at an angle to a vertical forward plane and to a vertical transverse plane. The tips of the tines sweep in an elliptical path (FIGS. 8, 18 and 19) having a major axis and a minor axis. The major axis B, FIG. 19, preferably extends between the lower conditioning roll 46 and the cutter bar. The preferred path A of the tines is that the tips swing down in front of the sickle 43 to pickup downed crops and sweep the crops angularly across the sickle and upwardly and rearwardly along the guide plate 84 into the space in front of the bite of the conditioning rolls and then passing in close proximity to the upper conditioning roll so that the downwardly moving forward surface of the upper roll 44 strips any crops on the tines. The tines release the crop material in the space in front of the bite and the rolls engage the material and draw it into the bite for crushing. The conditioning rolls are of the ribbed type with the upper roll being the more aggressive roll in feeding the crops. The elliptical path A, shown in FIG. 19, of the tines is also at an angle (FIG. 8). The tines on the right reel section sweep to the left and the tines on the left reel section sweep to the right so that across the width of the header the tines are moving in a converging relation on opposite sides of the center of the header. Due to the tilt of the spiders of the reel sections the tines of each reel section sweep at an angle across the sickle 43 and the guards projecting forwardly of the sickle. These guards extend parallel to the direction of movement of the header. The angular sweep of the tines across these guards has a substantially improved cleaning action over tines which operate parallel to the guards and the direction of movement of the tines. The outwardly tilt of the tines positions the free ends at the outer ends of the reel section for a full width raking action. The free ends may be at an angle to the rest of the tine and project downwardly for better raking action.

The left and right reel sections overlap at the adjacent ends. In viewing the crop converging and gathering reel in a forward direction, the right reel section 52 diagonally sweeps the crops to the left. The spiders 137,138 may be considered to slant to the left. The left reel section 51 can be considered to have the spiders 135,136 slanted to the right. This means that the tines and tine bars move into substantial overlapping relation when rearward of the tubular member and adjacent the conditioning rolls. In order to accommodate this overlap the spider arms and tine bars of the right section are offset to spiders and tine bars of the left section. Thus the tine bars of the two reel sections alternately sweep past the sickle and conditioning rolls. The meshing of the ring gears with the bevel spur gears maintains this relationship of the two reel sections.

With the tilting of the spiders the inboard and outboard spiders sweep outwardly to increase the width of the raking action of the reels. The side members, as previously described, have the side panels extending outwardly to provide recesses for the outboard and inboard reels. The greater the tilt of the spiders the greater width the reel covers in the raking action.

As best illustrated in connection with the embodiment shown in FIGS. 8 and 21 the outboard spiders extend forward and outwardly beyond the sides of the header. Thus the slanted outboard ends of the reel sections rake the crop ahead of the sides into the sickle. At the inner overlapping ends of the reel sections the tines of the reel sections alternately sweep down in front of the sickle to pickup the downed crops and sweep the crop across the sickle. The alternate tines sweep in opposite directions.

SPIDER MODIFICATION

In FIG. 3 a stamp sheet metal modification 172 of a spider is illustrated with five radially extending arms 173. The ring gear 174 is supported on a spider by the brackets 175 and the spider is connected to the outer race of the ball bearing 141. In FIGS. 4 and 5 the rotatable mounting of the ends of the tine bars on the outer ends of the spider arms 173 is illustrated in detail and is similar to the mounting in FIG. 17. The stud shaft 143 extends through the inner race of bearing 142 and is fastened in fixed relation by the spacing sleeves 177 and nut 178. The tine bar 140 is mounted on the outer race to rotate in relation to the arm. In FIG. 5 the bracket 175 supporting the ring gear 174 on the spider is illustrated.

SHORT DISCHARGE HEADER

As previously explained the invention is illustrated in FIGS. 25 and 26 embodied in a windrower. The windrow has a header frame 54 with a sickle 181 extending the full width of the header frame 54 and a discharge opening 55 substantially shorter than the sickle. A crop converging or gathering reel 56 is rotatably mounted on the header and comprises two reel sections 183,184 of opposite feeding angularities. Viewing the reel sections from the rear, the right reel section 184 is slanted to the left and the left rear section 183 is slanted to the right so that the adjacent spiders 186, 187 are on opposite sides from the companion end spiders 185,188. As illustrated in FIG. 22 the five arms of each spider and the associated tine bars 191,192 are circumferentially offset so that at the rear the tine bars of the right reel section sweep across the opening 55 opposite to the tine bars of the left reel section. As illustrated in FIG. 21 the opening 55 is approximately the same width as the maximum overlap of the tine bars at the rear of the reel. The tines 193,194 cooperate with the rear wall of the header frame to sweep the crops towards the opening over the distances D between the inner ends of the outboard spiders 185,188 and the opening. As each tine of a respective reel section sweeps across the back wall it carries in new crop material and urges the previous crop material further along the back wall until it reaches the opening and it falls through to join the material carried by the intersections of the tine bars overlapping with the opening during the rearward travel. Thus although the end spiders are substantial distances from the opening, the crop material will be moved toward the center by successive sweepings of the tine bars and a windrow will be formed that is about the width of the opening 55 and the rear overlap of the reel sections and substantially narrower than the width of the sickle.

The mower-conditioner previously described herein may be modified in accordance with the features of the windrower and the ends of the conditioning rolls may be spaced from the inboard and outboard ends of the reel sections. The crop material is fed to the rolls by successive sweeping action of the tines. The crop material between the ends of the spiders and the ends of the rolls would be in a trough-like space of the back wall. This space would be shaped similar to the space 200 shown in FIG. 19 of the drawings. The header therefore can be made of a substantially greater width than the length of the rolls and satisfactory feeding of the crop is obtained without the need of any additional components such as augers and drapers.

In another embodiment of the invention three dimensional cams are mounted at each end and the tine bars are mounted on supports rotating on the support tube. The cams are fixed and as the tine bars rotate the cam moves the bars longitudinally to sweep the cut crop from the sickle at the crop entering edge. At the adjacent end the bars are supported by rocking levers which permit the bars to follow the cams.

SUMMARY OF FEATURES AND ADVANTAGES

It is thus seen from the foregoing description of the structure and operation of the mower-conditioner and windrower embodiments that the header with the described crop gathering and converging reel is light in structure and equivalent in weight to a similar straight feed crop reel. The crop converging reel of this invention can sweep crops from a header wider than the length of the conditioning rolls without the need of an additional consolidating means to converge the crop material at the sides of the header. This means that the header is shorter in depth than a straight feed crop reel requiring an intermediate auger and is lighter since that component is not present. With the successive tines sweeping across the back wall of the header and along the guide plate the reel may be substantially wider than the length of the conditioning rolls and still feed the crop material from a wide sickle. Thus wider headers may be provided without increasing the length of the conditioning rolls.

Another advantage of the crop gathering and converging reel is that an elliptical shape may be imparted to the movement of the tines which provides a tilted elliptical path of the tines from up in front of the sickle along the guide plates and up to the conditioning rolls which provides a very desirable type of feed to the conditioning rolls. The slope and tilt of the spiders may be set for the optimum conditions and elliptical path shape to produce the most desirous type of feed to the conditioning rolls. This further simplifies the construction of the preferred crop gathering and converging reel over the straight reel with the cam track to move the tines away or parallel to the conditioning rolls at the conditioning roll bite. However as previously described the desired action may be attained with a reel having a cam track and rocking arms.

While this invention has been described in connection with a single embodiment, it will be understood that this embodiment is capable of modification and that this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention what I claim is:

1. A crop harvesting header with the width being transverse to the direction of travel and comprising:
   a frame having side members transversely spaced and having bottom and rear means extending upwardly and rearwardly with a rear discharge opening intermediate said end means,
   a support means mounted transversely within said header and spaced generally upwardly and forwardly of said bottom and rear means;
   a converging reel assembly having two reel sections extending along said support means and having inner adjacent ends of said sections disposed in overlapping relationship, said sections each having an inner spider at the overlapping end and an outer spider at the opposite end of said respective reel section and having tine bars extending between said inner and outer spiders, said spiders of one section slanted at an angle to said support means, said spiders of said other sections slanted at an opposite angle to said support means, said inner spiders at said overlapping ends being in diverging relation on rearward movement and said outer spiders in rearward converging relation with the respective spiders of each reel section disposed in parallel planes so that said reel sections sweep crops angularly towards said rear discharge opening.

2. A header as set forth in claim 1 wherein said spiders are slanted to a vertical plane extending axially along said support means.

3. A header as set forth in claim 1 wherein said spiders are slanted to a horizontal plane extending axially on said support means.

4. A header as set forth in claim 1 wherein said spiders are slanted to a vertical plane normal to said support means and to a horizontal plane extending axially along said support means.

5. A header as set forth in claim 4 wherein said tine bars have tines projecting downwardly from said tine bars to subscribe elliptical paths relative to said support means on rotation of said reel.

6. A header as set forth in claim 5 wherein said tine bar elliptical paths have major axes extending below said opening.

7. A header as set forth in claim 1 wherein said discharge opening has a length substantially less than the distance between the outermost points along the paths subscribed by said outer spiders at the opposite ends of said reel sections.

8. A header as set forth in claim 7 wherein said rear means has rearwardly extending troughs between said opening and said rearward portions of said outer spiders for movement of crops along said rear means by successive sweeping of said tines of said reel sections for discharge through said opening.

9. A header as set forth in claim 1 wherein said side members have outwardly extending panels forming facing recesses at opposite sides of said header and said spiders are tilted at an angle to the axis of said support member in a direction with the upper portion of said spiders tilted away from one another to sweep inwardly and rearwardly through said recesses.

10. On a mower conditioner header having a header frame with transversely spaced generally forwardly extending side members, wall means extending between said side members forming with said wall means a forward crop entering area and having a discharge opening, sickle means mounted on said wall means at said crop entering area, conditioning rolls of less length than said sickle means mounted on said wall means and fitting in said opening to pass and condition cut crops;
   a support means mounted on said side members, two reels rotatably mounted on said support means in a coaxial relationship with adjacent inner ends in overlapping relation, said reel sections comprising a pair of forwardly diverging spiders disposed on the outer portions of said support means; a pair of inner spiders disposed intermediately between said forwardly diverging outer spiders, each of said inner spiders being disposed in a plane parallel to an outer spider; and a plurality of tine bars having tines extending therefrom interconnected between respective parallel spiders to form the two reel sections, whereby said reels act to sweep crop rearwardly into said sickle means and upwardly along said wall means towards the overlapping ends to carry the crop from said longer sickle to said shorter rolls for feeding all of the crop material to said rolls.

11. On a mower-conditioner header as set forth in claim 10 in which said reels have outer end members adjacent said side members and inner end members, said inner end member of one reel being on the opposite side of the inner end member of said other reel from said outer end member of said one reel for overlapping said reels.

12. A header as set forth in claim 11 wherein said overlap at the rear of said reels is substantially equal to the length of said rolls.

13. A converging gathering reel assembly adapted to be mounted within a header for engaging a relatively wide swath of crop material and converging it into a relatively narrow swath as the header moves through a field, comprising in combination: a main support member; a pair of forwardly diverging spiders disposed on the outer portions of said main support member; a pair of inner spiders disposed intermediately between said forwardly diverging outer spiders, each of said inner spiders being disposed in a plane parallel to an outer spider; a plurality of tine bars interconnected between respective parallel spiders to form two reel sections, said tine bars of each reel section extending inwardly to form an overlapped region about the medial portion of said converging reel assembly; and a series of tines secured to each tine bar and extending therefrom for crop engagement.

14. A converging reel assembly, as recited in claim 13, wherein the tine bars of each reel section are circumferentially staggered to avoid interference about the overlapped region of said reel assembly.

15. A converging reel assembly, as recited in claim 13, wherein the inner spider of one reel section is disposed intermediately between the inner and outer spiders of the other reel section, and wherein each tine bar has opposite ends secured to respective points of the two parallel spiders of a particular reel section.

16. A converging reel assembly, as recited in claim 13, wherein a bearing assembly secures opposite portions of each tine bar to each parallel spider of a respective reel section, said bearing assembly including a stud fixed to said spider and extending generally perpendicular to the plane thereof, and a bearing interposed between said stud and tine bar.

17. A converging reel assembly, as recited in claim 13, wherein each of said tines are particularly shaped to include a lower free end angled inwardly relative to an upper portion of the respective tine such that crop material naturally moves toward said angled lower end as it is swept rearwardly by said reel assembly and is maintained on said tines by the lower angled end for inward movement, wherein once the particular tine has reached its extreme inward position the crop material falls freely therefrom.

18. A converging reel assembly, as recited in claim 13, wherein bearing means are provided for interconnecting each tine bar to a respective spider such that upon the rotation of said spiders about said main support member, said tine bars and associated tines are relatively free of rotation with said tines maintaining a near constant attitude.

19. A converging reel assembly, as recited in claim 18, wherein said tines are oriented so as to extend generally downwardly from each tine bar such that when employed within a header, crop material is swept rearwardly and inwardly, and thereafter naturally falls from the tines as the tine bars move upwardly and forwardly within the reel cycle.

20. A converging reel, comprising: an elongated support tube; a pair of generally forwardly diverging outer spider rotatably mounted about opposite ends of said support tube; a pair of laterally spaced rearwardly diverging inner spiders rotatably mounted about a medial portion of said support tube, each inner spider being disposed in a plane parallel to the most remote outer spider disposed adjacent the other inner spider such that the distance between respective points of the parallel inner and outer spiders remains generally constant as the spiders are rotated; and a plurality of generally equidistant tine bars with tine members extending therefrom, said tine bars interconnecting corresponding peripheral points of each inner spider with the remote outer spider disposed adjacent the other inner spider, thereby resulting in the tine bars and associated tines being overlapped between the two inner spiders to yield continuous crop engagement between the two generally forwardly diverging outer spiders while possessing an overall converging characteristic due to the inherent inward movement of the tine bars and associated tines during portions of the reel's cycle.

21. A converging reel for employment within an agricultural machine adapted to harvest crop material as it travels forwardly through a field, comprising in combination, a main support tube and a pair of converging reel sections generally disposed on opposite sides of said main support tube, each reel section including an outer and inner spider interconnected by a plurality of tine bars each having crop engaging tines extending therefrom, said outer and inner spider of each reel section being rotatably mounted within generally parallel planes angled relative to the longitudinal axis of said main support tube such that the outer and inner spiders of each reel section tends to project forwardly and outwardly toward the side of the respective reel section such that during a rotative cycle of the spiders the tine bars and associated tines move from an outer forward crop engaging position to an inner rearward position, converging the crop inwardly in the process, and from the inner rearward position back to the outer forward crop engaging position, and wherein the inner spider of each reel section giving rise to an overlapped relationship about a medial portion of said main support tube, thereby assuring full width crop engagement by the two reel sections while converging the harvested crop by the inner rearward movement of the tine bars and tines.

* * * * *